F. G. SIEMERS.
Improvement in Meat Cutters.
No. 115,987. Patented June 13, 1871.
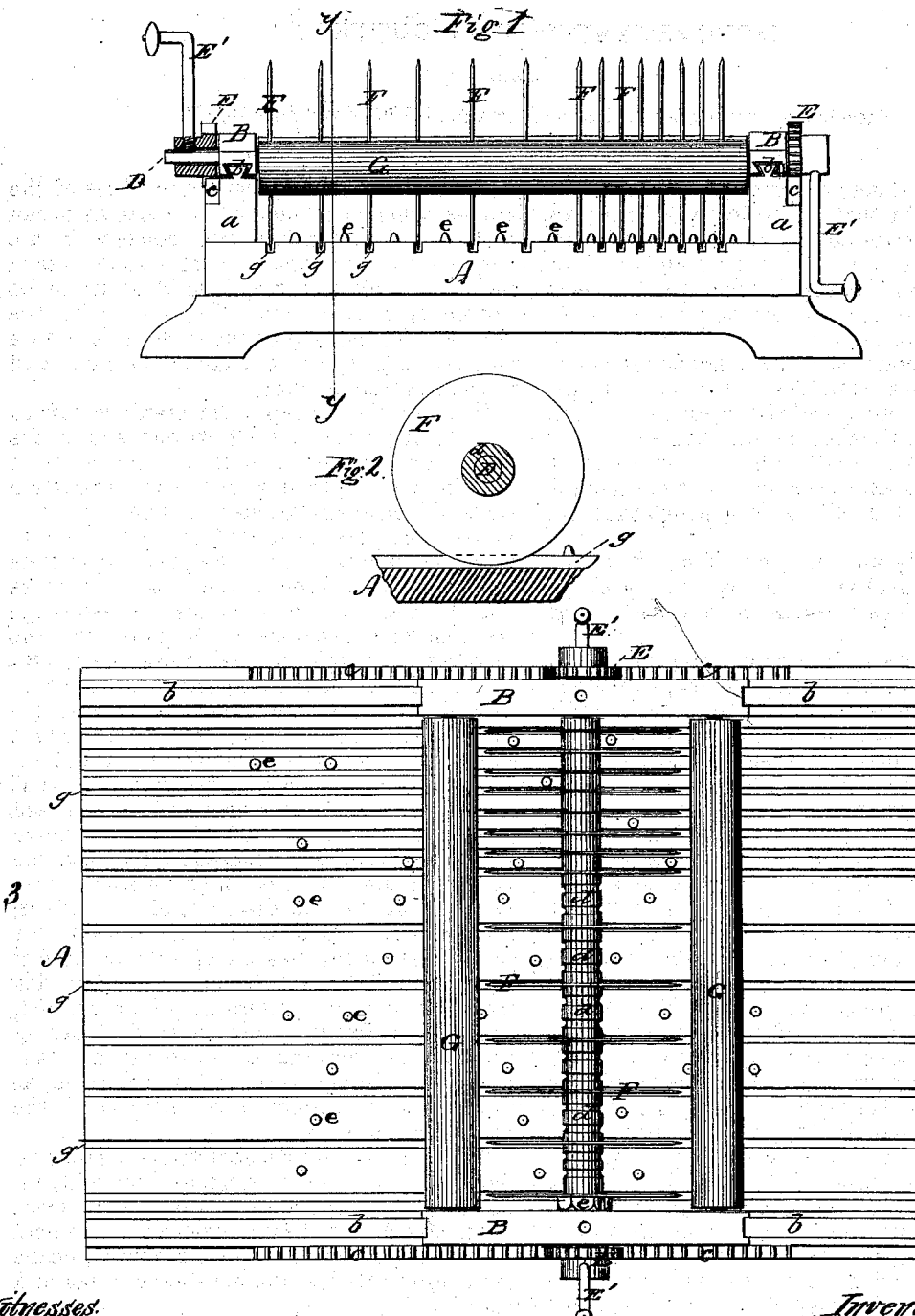

UNITED STATES PATENT OFFICE.

FRENZES G. SIEMERS, OF WINONA, MINNESOTA.

IMPROVEMENT IN MEAT-CUTTERS.

Specification forming part of Letters Patent No. 115,987, dated June 13, 1871.

*To all whom it may concern:*

Be it known that I, FRENZES G. SIEMERS, of Winona, in the county of Winona and State of Minnesota, have invented certain Improvements in Meat-Cutters, of which the following is a specification, reference being had to the accompanying drawing.

My invention relates to a machine for cutting meat into small particles for sausages and like purposes; and the machine consists in a series of parallel circular knives secured on a horizontal shaft, which is so mounted and arranged as to be moved by a hand-crank back and forth over a table on which the meat is placed.

Figure 1 is an end view of my machine; Fig. 2, a vertical section on the line $y\ y$ of Fig. 1; and Fig. 3 is a top plan view of the machine.

A represents a flat rectangular bed or table, having two parallel raised ledges, $a$, along the sides. On each of the ledges $a$ is secured a bar or rail, $b$, of a dovetail form in cross-section; and by the outer side of each of these rails is secured a toothed bar, $c$. On each of the bars $b$ is mounted a block or bolster, B, so as to slide freely thereon; and across the bed is placed a horizontal shaft, D, with its ends mounted in the bolsters B, as shown. To each end of shaft D is secured a pinion, E, which gears into the adjacent rack-bar $c$; and to one or both of these pinions a hand-crank, E', is secured, as shown. By turning the crank, and thereby the shaft D, the pinions are both caused to travel along the rack-bars, and thus to move both bolsters endwise along the bars $b$, carrying, of course, the shaft with them. The parts being arranged in this manner, the two yokes must always move together, so as to be at all times directly opposite each other. On the shaft D, between the bolsters, is mounted a series of parallel circular knives, F, which are kept at the proper distance apart by interposing washers $d$ between them. The knives are held firmly to the shaft, so as to rotate with it, by means of nuts $e$, screwed onto the shaft against the end knives, so as to compress the whole series, with their washers, firmly together. When the cranks E are turned so as to move the bolsters and the shaft D, as described, the knives F are moved lengthwise over the table. Grooves G are made in the table to receive the edges of the knives, which are made of such size as to run therein. Between the two bolsters B are mounted two horizontal rollers, G, one on each side of the cutters or knives F, so as to be carried to and fro over the table with the knives. On the face of the table is secured a number of pins, $e$, to engage in the meat and prevent it from moving.

In using the machine the crank is turned so as to move the cutters to one end of the table, and then the meat is laid on the table and the crank turned so as to run the cutters across the meat and divide the same into slices. These slices are then laid on their sides in pairs, one on top of the other, and the cutters run lengthwise through them, and the slices thus divided into square strips. These strips are then laid crosswise of the table and the cutters run at right angles across them. By this last operation the strips are cut into small cubical pieces, suitable for use in sausages and for similar purposes. As the pinions which move the cutters over the bed are smaller than the cutters themselves, it follows that the edges of the cutters travel at a speed greater than that at which the cutters move across the table, and, consequently, that the cutters act upon the meat with a draw or shear cut. Owing to this draw cut of the knives, and the fact of their extending down into the grooves below the meat, a clean and perfect separation of the same is effected. The distance between the cutters may be regulated, as necessary, by removing the shaft D, taking off nut $e$, and slipping off the knives, and taking out or adding washers between them, as required. The rollers G serve to hold the meat down in place.

The machine thus constructed is cheap, simple, and efficient in its operation, and will, unlike any other machine in use, cut the meat into pieces all of the same size and of a cubical form. It may also be used for cutting beans and similar articles, and for slicing bread and vegetables.

It is obvious that, instead of gearing, straps may be used having one end attached to the frame or bed with their opposite ends secured to the shaft, for moving the knives to and fro; and also that, instead of the dovetail strips $b$, right-angled flanges and grooves may be used.

Having thus described my invention, what I claim is—

1. The shaft D, having the rotary knives F and pinions E mounted thereon, in combination with the bed A provided with the sides $a$ and racks $c$, all arranged to operate substantially as described.

2. The bed A provided with the pins $e$ for holding the material in place while being cut, substantially as set forth.

FRENZES G. SIEMERS.

Witnesses:
 GEORGE P. WILSON,
 G. W. WOODS.